United States Patent

Maricle

[11] 3,844,636
[45] Oct. 29, 1974

[54] ELECTROCHROMIC MIRROR

[75] Inventors: Donald Leonard Maricle, Londonderry, N.H.; Robert Domenico Giglia, Rye, N.Y.

[73] Assignee: American Cyanamid Company, Stamford, Conn.

[22] Filed: Dec. 13, 1972

[21] Appl. No.: 314,629

[52] U.S. Cl. .............................................. 350/160
[51] Int. Cl. ............................................ G02f 1/36
[58] Field of Search ................................... 350/160

[56]  References Cited
UNITED STATES PATENTS
3,578,843   5/1971   Castellion ........................... 350/160
3,712,710   1/1973   Castellion et al. ................. 350/160

*Primary Examiner*—William L. Sikes
*Attorney, Agent, or Firm*—Charles J. Fickey

[57]  ABSTRACT

Electro-optical device particularly useful in the modulation of reflected light typically comprising an electro-chromic device containing a porous metal reflecting layer in sandwiched arrangement, said electrochromic device being a sandwich arrangement of the reflecting layer, with a film of an electrochromic layer disposed between the light source and the reflecting layer. The electrochromic layer exhibits coloration and bleaching thereof at ambient temperature by control of the polarity of an applied electric field, whereby light reaching the reflecting layer is modulated in intensity, thus modulating, in turn, the reflected light.

8 Claims, 9 Drawing Figures

PATENTED OCT 29 1974　　　　　　　　　　　3,844,636

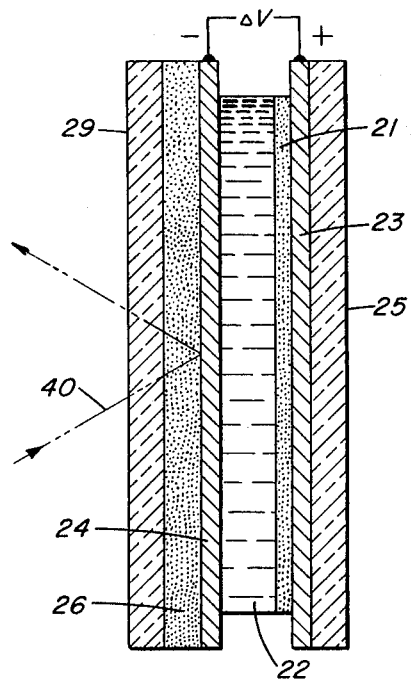
FIG.4
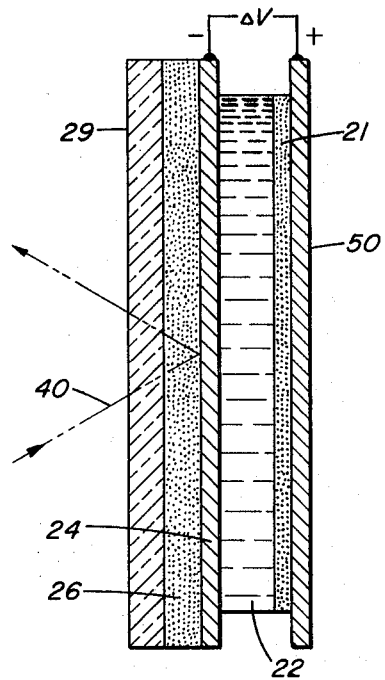
FIG.5
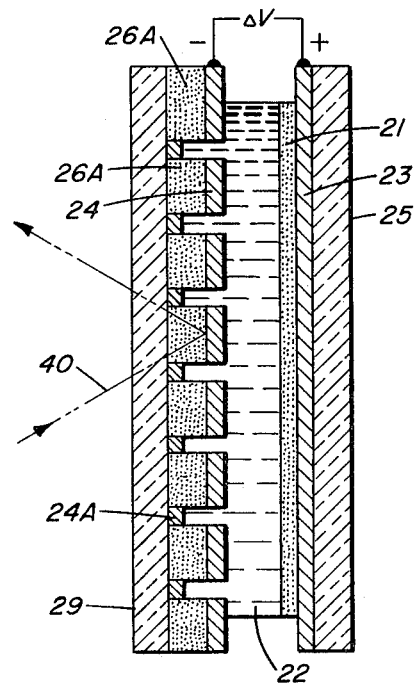
FIG.6
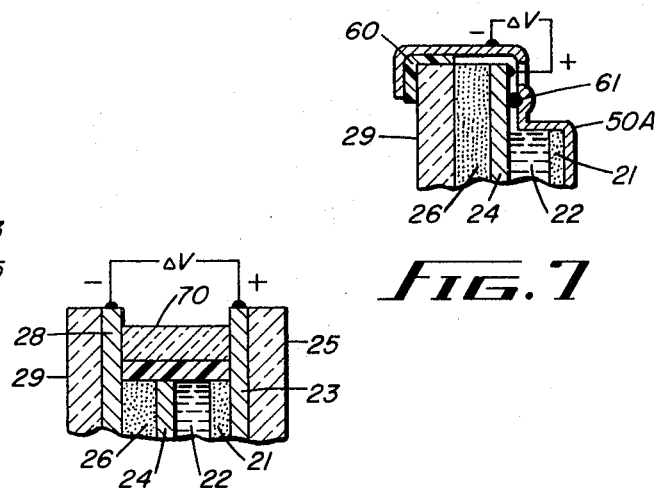
FIG.7
FIG.8
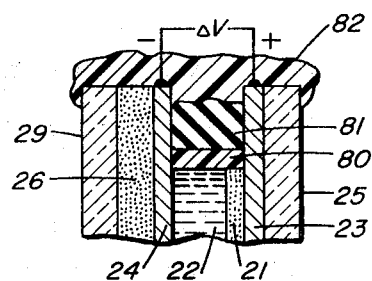
FIG.9

ELECTROCHROMIC MIRROR

BACKGROUND OF THE INVENTION

In U.S. Pat. No. 3,578,843, there are described reflective electro-optical devices exhibiting a phenomenon known as "persistent electrochromism." This term denotes the property of a material, whereby its electromagnetic radiation absorption characteristic is altered at ambient temperature under the influence of an electric field. Such materials as for example, tungsten oxide and molybdenum oxide, may exhibit little or no absorption of visible wavelengths in the absence of an electric field and, therefore, are transparent. When subjected to an electric field, however, they effectively absorb in the red end of the spectrum, turning blue in color. If the electrodes and the electrochromic layer are formed on the surface of a transparent substrate, such as glass, or clear acrylic resin, and in front of a reflecting surface, the light transmitting characteristics of the combination can be varied by controlling the electric field produced across the electrochromic layer. Thus, if the "sandwich" of electrodes and electrochromic material on the substrate originally is clear, application of a voltage across the electrodes to establish an electric field of the proper polarity changes the light absorption characteristic of the electrochromic material, turning it darker for example, thus decreasing the light transmitting ability and therefore the light reflecting ability of the entire assembly.

As further described in U.S. Pat. No. 3,521,941, when an additional layer of solid state material such as silicon oxide or calcium fluoride characterized as a current carrier permeable insulator is placed between one of the electrodes and the electrochromic material it not only permits the absorption characteristic of the electrochromic material to change rapidly under the influence of an electric field of a given polarity but it also renders the electrochromic layer sensitive to a field of the opposite polarity to return it positively to the absorption state it occupied prior to the initial application of the field. This concept was applied in the control of light reflected from a mirror.

While the mirror device of the foregoing disclosure functioned satisfactorily it had a relatively limited service life since the current carrier permeable insulator was not chemically and electrochamically matched to the counter electrode in contact therewith.

In copending, commonly assigned U.S. application Ser. No. 41,153, filed May 25, 1970, is disclosed an electrochromic optical device having in sandwiched arrangement a transparent electrode, an electrochromic layer, an electrolyte layer and a counter electrode layer incorporating an electrochromic layer.

While all of the devices heretofore described were useful, there were certain disadvantages due to the fact that the optical path through the number of layers of the device resulted in loss of image clarity or light intensity. Attempted placement of the mirror surface closer to the incoming surface of the incident light resulted in undesirably slow electrical flow and switching characteristics.

SUMMARY OF THE INVENTION

It is a principal object of this invention to provide a reflecting device for modulating reflected light, which is more rapid in switching and simpler in construction.

Another object of the present invention is to provide an improved form of electro-optical light modulating device wherein a reflective layer can be placed directly in contact and behind an electrochromic layer so as to provide improved optical properties.

These and other objects of the invention1will become apparent as the description thereof proceeds.

Briefly stated, the device of the present invention comprises in sandwich arrangement, a transparent layer, a persistent electrochromic layer, an ion porous metal reflecting electrode additionally serving as a mirror layer, an electrolyte layer and an electrochromic counter electrode. In operation, when the device of the present invention is placed in an electric circuit with the counter electrode negative and the reflecting electrode positive, the electrochromic layer will become colored. Thus, the amount of light reaching the reflecting surface from the side of the transparent surface and being reflected back will be reduced. Reversing the circuit polarity will cause the electrochromic layer to bleach to the colorless state, thus increasing the reflected light from the reflecting surface to its original intensity.

Thus, elimination of the porous insulating layer of the previous device makes it possible to use the porous reflecting layer to make electrical contact with the electro-chromic layer thus eliminating need for relatively costly transparent electrodes such as NESA glass, and eliminating internal reflections and other light losses caused by the NESA glass and insulating layer. Moreover, the porus structure of the reflecting layer permits current flow over the entire surface of all layers from the counter electrode, through the electrolyte and to the electrochromic light modulating layer. This results in more rapid and uniform darking or bleaching of the modulating layer.

The foregoing and other features, objects and advantages of the present invention will become more apparent from the following detailed description thereof taken in conjunction with thee accompanying drawings in which:

FIGS. 4 to 6 are views in cross-section of alternative construction of the present mirror device; and FIGS. 7, 8 and 9 are partial cross-sectional views of alternative seal construction for the present mirror devices.

Figure 1:
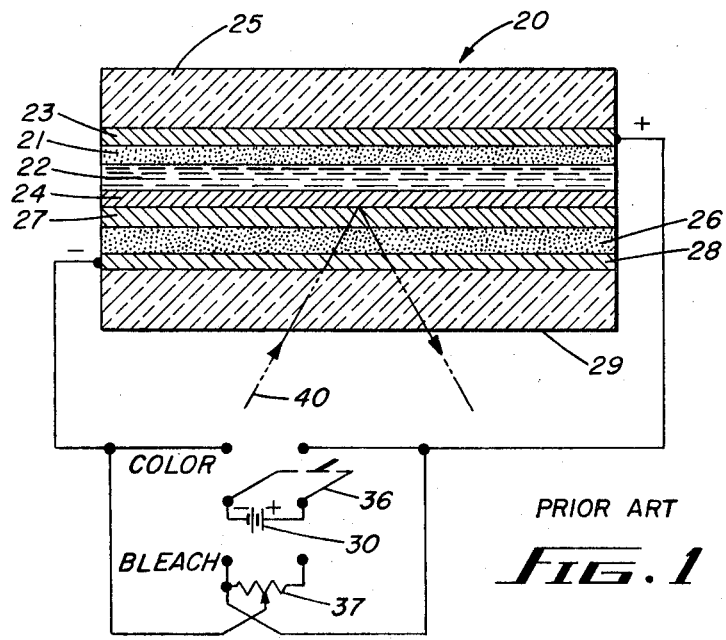
FIG. 1 is an illustration, partly in cross-section, of an electro-optical device of the present invention, type described and claimed in the foregoing earlier applications.

In the description herein the device of the present invention is described in terms of its effect on visible light transmission characteristics, i.e., the variation in the wavelength absorption of the electrochromic material within the visible region of the spectrum. It will, of course, be recognized that the phenomenon exhibited by the type of materials to be described is not limited to the visible spectrum but may extend into the invisible regions.

ELECTROCHROMIC MATERIALS

As a critical element of the device defined hereinafter, there is employed a "persistent electrochromic material." It is defined as a material responsive to the application of an electric field of a given polarity to change from a first persistent state in which it is essentially non-absorptive of electromagnetic radiation in a given wavelength region to a second persistent state in which it is absorptive of electro-magnetic radiation in the given wavelength region. Once in said latter state, said persistent electrochromic material is responsive to the application of an electric field of the opposite polarity to return to its original state. Certain of such materials can also be responsive to a short circuiting condition, in the absence of an electric field, so as to return to the initial state.

By "persistent" is further meant the ability of the material to remain in the absorptive state to which it is changed, after removal of the electric field, as distinguished from a substantially instantaneous reversion to the initial state, as in the case of the well-known Franz-Keldysh effect.

The materials which form the electrochromic materials of the device in general are electrical insulators or semiconductors. Thus are excluded those metals, metal alloys, and other metal-containing compounds which are relatively good electrical conductors.

While not wholly understood, it appears that the materials contain in non-stoichiometric proportions at least two different elements, said elements being present as ions of opposite polarity. This condition produces lattice defects as distinguished from mere physical displacement of crystal symmetry, although the condition may also result in or be evidenced by such. Lattice vacancies are particular instances of lattice defects as, for example, an oxygen vacancy in a metal oxide crystal.

The class of materials comprises those disclosed in the above-mentioned prior patent applications. These materials exhibit persistent electrochromism over a wide temperature range including ambient temperature and in some instances high temperatures, e.g., above about 125° C. or low temperatures, e.g., below about −50° C. By "ambient temperature" is meant temperatures normally encountered in the fields of use of the devices such as described hereinafter, e.g., −50° C. to 125° C.

These materials are further characterized as inorganic substances which are solid under the conditions of use, whether as pure elements, alloys, or chemical compounds, containing at least one element of the Periodic System which can exist in more than one oxidation state in addition to zero. The term "oxidation state" as employed herein is defined in "Inorganic Chemistry," T. Moeller, John Wiley and Sons, Inc., New York, 1952. These include materials containing a transition metal element (including Lanthanide and Actinide series elements); materials containing non-alkali metal elements such as copper, tin and barium; and materials containing an alkali metal element with a variable oxidation state element. Preferred materials of this class are films of transition metal compounds in which the transition metal may exist in any oxidation state from +2 to +8. Examples of these are: transition metal oxides, transition metal sulfides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfides of the metals of Groups IVB, VB and VIB of the Periodic System, and Lanthanide series metal oxides and sulfides. Examples of such are copper stannate, tungsten oxide, molybdenum oxide, cobalt tungstate, metal molybdates, metal titanates, metal niobates, and the like.

The electrochromic materials are distinguished from prior known organic or inorganic materials which exhibit coloration in an electric field as a result of the Franz-Keldysh effect or the effect Platt describes as "electrochromism." As to Platt, see J. Chem. Phys. 34, 862–3 (1961). In the latter cases, coloration results from the shifting of an existing absorption band or spectral line by the electric field; whereas in the present invention, upon coloration, an absorption band is created where none existed before, or removed upon bleaching.

An important advantage of devices of the invention containing persistent electrochromic material is operability at ambient temperature. So far as is known, this is the first instance of electrochromic behavior at temperatures of practical application. The invention, therefore, permits numerous practical applications to which prior art electro-optical devices are not susceptible as will be evident from the ensuing description.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optimum thickness will also be determined by the nature of the particular compounds being laid down as films and by the film-forming method since the particular compound and film-forming method may place physical (e.g., non-uniform film surface) and economic limitations on manufacture of the devices.

The films may be self-supporting, depending on thickness and film material, or may be laid down on any substrate which, relative to the film, is electrically non-conducting. Suitable substrate materials include glass, wood, paper, plastics, plaster, and the like, including transparent, translucent, opaque or other optical quality materials.

REFLECTIVE METAL ELECTRODES

A large variety of materials exhibiting electrical conductivity and light reflection characteristics may be used for the reflective electrode. Typical electrode materials are the metals, e.g., sodium, potassium, lithium and rubidium and conducting non-metals such as suitably doped tin or indium oxide and the like. The electrode should be of reflecting quality effective as a mirror surface for visible light and it should be ion-porous. Additionally, this mirror electrode should be chemically and electro-chemically matched with the current carrying semipermeable insulating layer.

In the present invention, it has been found that the counter electrode may be formed of electrochromic material, or graphite alone or an admixture of graphite with the electro-chromic material. The graphite is finely divided, high surface area graphite and is mixed with an acid resistant binding agent. The mixture may be in a fluid or powdered form, depending on the state of the binding agent, i.e., fluid or solid. If the mixture is fluid, it is simply applied to a surface by spraying, brushing on, and the like. With a solid, powdered mixture, it is sprinkled on to a surface, for example. After application of the mixture, it is cured by heating. Means are provided for supplying electric current to the counter electrode layer. Any conventional means is suitable. A particularly advantageous means for electrical connection is to deposit the electrode mixture on a conductive surface, such as NESA glass. When an electrochromic material is included in the counter electrode, it is also in a finely divided form and is admixed with the graphite and binding agent.

BINDING AGENTS

The binding agent for the layers may be any suitable acid resistant binder material which may be cured at ambient or elevated temperatures. Examples are silicates, epoxies, polyesters or polyethylene powders, and the like.

ELECTROLYTE SPACING LAYER

A semi-solid ion conductive gel may be employed One embodiment comprises in combination sulfuric acid and a gelling material for the acid. Any gelling agent which is compatible with the other components is suitable. Particularly advantageous gelling agents are polyvinyl alcohol, polyacrylamide, sodium silicate, cabo-sil, and the like.

A preferred embodiment employs $H_2SO_4$ in combination with polyvinyl alcohol. The properties of this gel may be varied in advantageous manner by employing polyvinyl alcohol of various molecular weights, differing sulfuric acid concentration and different polyvinyl alcohol to acid ratios. Thereby, gels can be produced to give a specific conductivity in the range of from about 0.10 to 0.60 $ohm^{-1}\ cm^{-1}$.

A distinct advantage of the above mentioned gels is their high ionic conductivity and good chemical stability. We have found that both requirements are unexpectedly met by gels in the preferred conductivity range of 0.20–0.40 $ohm^{-1}\ cm^{-1}$.

Other materials may be incorporated into the gel to vary the physical properties of the gel such as viscosity and vapor pressure. Thus, the composition may optionally include organic solvents such as dimethyl formamide, acetonitrile, propionitrile, butyrolactone and glycerin.

Further, the gels used in the instant invention may be made opaque with, for example, stable, white or colored pigments such as $TiO_2$ or $TiO_2$ doped with Ni, Sb for use in certain electrochromic display device applications. A fluid layer containing an acid may also be used in place of the gel, as disclosed in copending, commonly assigned application Ser. No. 41,154, filed May 25, 1970.

The spacing layer may also be made ionically conductive by a semi-solid material such as a paste, grease or gel containing some ionically conducting materials. The dispersing medium may be one selected from a group consisting of an ionically conductive paste, grease or gel. A preferred embodiment in the present invention comprises the use of a conductive lithium stearate grease containing dispersed therein propylene carbonate and p-toluene sulfonic acid. The semi-solid medium can contain one or more salts selected from Group IA and IIA alkali or alkaline earth materials. Smaller ions such as lithium and sodium are preferred to larger ions as potassium and rubidium since ionic mobility in the electrochromic layer may be a limiting factor. The significant improvements in electrode reversibility and reproducibility and the important advantage of long term stability of operation by use of these gels were unexpected. This is a significant advantage in applications requiring long term service stability. Thus, alpha numeric character presentation and data display devices, wherein the service requirement is stated in years and/or millions of cycles, have become commercially feasible.

Turning to the drawings, FIG. 1 illustrates a prior electrochromic mirror device 20 making use of an insulating layer 27. The device is viewed from the direction of incident ray 40. The device is constructed with two outside layers of NESA glass, the front layer being glass 29 and tin oxide layer 28, and the back layer being glass 25 and tin oxide layer 23. On the tin oxide layer 28, are successively a layer of electrochromic material 26, a layer of insulating material 27, e.g., silicon dioxide, and a porous deposit of a conductive reflective material 24. On tin oxide layer 23 is deposited a counter electrode material 21, e.g., graphite or an electrochromic material. A layer of an acid electrolyte material 22 is sandwiched between the two described NESA glass plates, and the edges are sealed by suitable means, which will be known to persons in the art. The persistent electrochromic material may be tungsten oxide or molybdenum oxide. A source of d.c. potential 30 is coupled between the conductive films with its positive terminal on rear tin oxide layer 23 and its negative terminal on the forward tin oxide layer 28.

The negative and positive electrodes need only be in electrical contact with the film. Any type and arrangement of electrodes and film effective to impose an electric field on the film when the electrodes are connected to a voltage source, will be suitable. Thus, the electrodes may be spaced conducting strips deposited on or inbedded in the film, or preferably they may be conducting layers between which the film is inserted.

The device functions effectively in a reversible manner. For this purpose, the battery 30 is coupled to the electrodes 23 and 28 through a reversing switch indicated generally at 36. As shown, with the switch arm in the position to produce coloration, the positive terminal of the source is connected to the rear tin oxide layer 33 while the negative terminal is connected to the forward tin oxide layer 28.

Once complete coloration is induced, which in a typical case is a matter of seconds or less, the switch 36 may be opened, disconnecting the battery from the device entirely, and the device will remain in its darkened state without further application of power.

To bleach or erase a previously darkened surface, the switch arm is thrown to the "bleach" contacts, across which is connected a potentiometer 37. As shown, the potentiometer contact or slider is movable from a point at which the electrodes 23 and 28 are short circuited to a point at which full battery voltage, of polarity opposite to the coloration condition, is applied between them. Any number of reverse voltage values may be obtained between the two extremes.

In the position illustrated in the drawing, a "bleach" voltage of a value less than battery voltage is applied across the electrodes, setting up a corresponding electric field. Under the influence of this field, the device returns to its initial uncolored state. The rapidity with which the bleaching occurs is determined by the magnitude of the voltage; the higher the voltage, the faster the bleaching process is completed. At the higher bleaching voltages, it has been found that the bleaching process is even faster than the coloring operation. Once the bleaching is completed, no further coloration is observed with its polarity and the switch may be opened to disconnect the battery from the device and minimize power drain.

It has also been found that, notwithstanding the absence of an electric field, when the potentiometer is in its short circuiting position, certain of the persistent electrochromic materials nevertheless will return completely and positively to the initial state. The rate at which the bleaching occurs, however, is somewhat slower than when the material is subjected to an electric field.

Figures 2, 3:
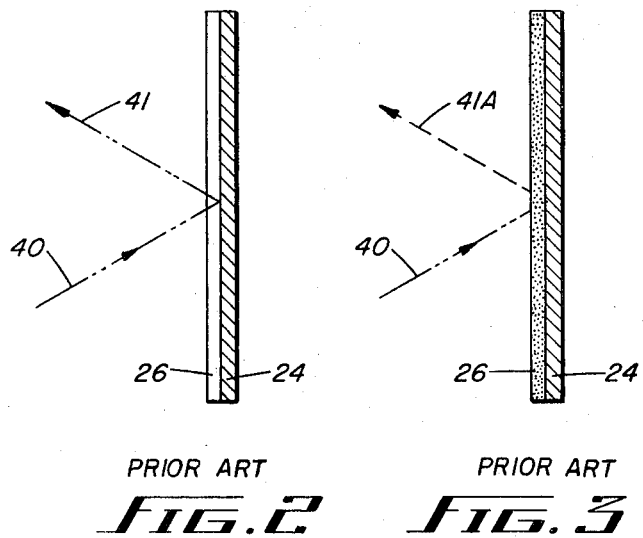
FIGS. 2 and 3 are diagrammatic illustrations of the inventive device in the modulation of reflected radiation.

Thus, the device of FIG. 1 functions as a self-contained modulator for reflected light. As shown in FIG. 2, a light ray 40 is reflected as a substantially full intensity ray 41 when the device 20 is in a bleached state. When the device is colored, as shown in FIG. 3, the amount of light from ray 40 passing through the colored electrochromic layer 26 to the reflecting layer 24 and from the reflecting layer is less due to absorption. Thus the reflected ray 41A is lower in intensity. The difference in intensity may be varied as desired by controlling the density of coloration of electrochromic layer 26. The coloration is a function of the time that the current is applied, up to a certain maximum coloration. Thus if the current is applied for any time interval less than that required to obtain maximum coloration, a lesser amount of coloration will be obtained which will absorb less light, giving more reflected light. The amount of reflected light may thus be varied from the total, to any amount down to the minimum allowed.

Moreover, when the coloration current is cut off, the state of coloration reached at that point persists and does not require constant application of current to be maintained.

FIGS. 4 through 6 illustrate alternative construction of the device of the present invention wherein the insulating material and the forward tin oxide layer are omitted. In FIG. 4, an electrochromic layer 26 is deposited on a glass sheet 29, and an ion porous layer of a conductive reflective material 24 is deposited on layer 26. This unit is separated from the rear glass 25 and tin oxide layer 23 with counter electrode layer 21 by acid electrolyte layer 22. In this embodiment the positive electrical connection is to tin oxide layer 23, while the negative electrical connection is to the reflective layer 24. Operation is as described for the device of FIG. 1.

In FIG. 5, the rear glass plate 25 and tin oxide layer 23 are replaced by a stainless steel plate 50. The negative electrical connection is to reflective layer 24 and the positive electrical connection is to plate 50. This type of construction requires no NESA glass layers.

In the embodiment of FIG. 6, the rear glass plate 25 with tin oxide layer 23 and counter electrode 21 is used as in the device of FIG. 4, together with an electrolyte layer 22. However, the front glass plate is of alternative construction. In the device of FIG. 6, the electrochromic layer 26A is laid down on glass plate 29 as an interrupted layer so that parts of glass plate 29 are not covered. The ion porous conductive reflector layer 24 is then deposited over the electrochromic layer 26A whereby it also forms a reflective deposit 24A directly on the areas of glass plate 29 which were not covered by electrochromic layer 26A. In this construction, the negative electrical connection is to the mirror layer 24 and the positive electrical connection is to tin oxide layer 21. The use of an interrupted reflective layer results in improved switching speed.

FIG. 7 illustrates a suitable steel construction for the device of 5 having a stainless steel back shell 50A which acts as the case for the device. The shell 50A has the counter electrode layer 21 deposited on its inner surface. Shell 50 is then crimpled around a glass plate 29 having electrochromic layer 26 and reflective layer 24 deposited thereon successively. A plastic ring 60 forms a seal between shell 50A and glass plate 29. A plastic spacer ring 61 seals the electrolyte layer 22 in place. The negative electrical connection is to the reflective surface 24, made through an opening 62 in shell 50A, while the positive electrical connection is made to the outside of shell 50A at any suitable point.

FIG. 8 shows a seal means for devices constructed as in FIGS. 4 and 6. In this embodiment, the space between tin oxide layers 28 and 23 is sealed by a glass frit 70. Negative electrical connection is to tin oxide layer 28 and positive electrical connection is to tin oxide layer 21.

The seal illustrated in FIG. 9 is shown for the device of FIG. 4. A plastic spacer 80 is placed between electrochromic layer 24 and tin oxide layer 23, sealing off electrolyte layer 22 and counter electrode 21. The plastic spacer is then sealed in place with RTV rubber 81, and the entire assembly is edge sealed by epoxy coating 82.

As will be apparent from the specific examples to be described below, many combinations of persistent electrochromic materials, insulating materials and electrode materials may be employed in accordance with the present invention.

EXAMPLE 1

In the following example, construction of one typical embodiment of a mirror device is described. The mirror construction is according to FIG. 4, and the seal construction is according to FIG. 9.

PREPARATION OF COMPONENTS (type 2 mirror, Type A seal)

1. EC Electrode
   1. cut glass to size (3 × 5 inches)
   2. rinse in chlorofrom, then 3–5 minutes in ultrasonic cleaner, DI water rinse and reagent grade acetone.
   3. vacuum deposit Fisher $WO_3$ $0.2\mu$ to $1.5\mu$ thick film to one side of glass.
   4. vacuum deposit palladium 200 A to 600 A thick onto $WO_3$ film.
   5. ammonia gas treat the $WO_3$ film through the Po for ½ hour.
   6. vacuum the EC electrode for 5 minutes to remove traces of unreacted gas.
2. Electrolyte 1. mix 500 ml. of Fisher reagent grade glycerin with 50 ml. of concentrated sulfuric acid Baker & Adams' Reagent Grade.
2. add alpha $WO_3$ (excess) and heat at 50° C. for 2–7 days to saturate solution. Decant solution from solids.
3. Counter Electrode
1. cut NESA (100 SL/B) 3 × 5 inches, approximately.
2. brush coat Dixon Crucible Co. Graphokote 120 onto NESA through a mask to leave clear edges.
3. air dry ½ hour minimum, then slow bake to 400° C. for 15 minutes, followed by slow cool to room temperature.
4. brush coat a 6 percent solution of $WO_3$ in $NH_4OH$, 29 percent solution.
5. air dry ½ hour minimum, followed by vacuum dry for 5 minutes.
4. Misc. Components
1. cut plastic spacer 0.020 inch–0.030 inch thick.
2. cut terminal wires.

ASSEMBLY

1. RTV bond plastic spacer to EC electrode face leaving break in space 1/16 wide for filling later.
2. indium solder wires to edge zone of EC electrode and edge zone of NESA on counter electrode.
3. over-coat indium solder zones with epoxy.
4. join EC electrode and C'electrode and seal eedges except filling zone with RTV rubber. Cure overnight.

5. vacuum fill drench with electrolyte. Seal filling hole with RTV rubber.
6. over coat RTV rubber with epoxy to complete assembly.

EXAMPLES 2 to 6

In th following Table I, are listed electrolytes used to construct similar cells, to that described in Example 1 above. The electrolyte composition of Example 1 is also listed for comparison.

TABLE I
USEFUL ELECTROLYTES

1. Glycerin:$H_2SO_4$ (10:1)
2. Ethylene glycol:$H_2SO_4$ (10:1)
3. Glycerin:p-toluene sulfonic acid (3:1)
4. Ethylene glycol:p-toluene sulfonic acid (3:1)
5. Glycerin:ethane sulfonic acid (10:1)
6. Phosphoric acid: sulfuric acid (10:1)

The following examples illustrate alternate forms of counter electrodes.

EXAMPLE 7
GRAPHITE ON SUBSTRATE

A counter electrode was prepared as follows: Dixon Crucible Co. Graphokote No. 120 was brushed on a clean substrate of NESA glass. Air drying for ½ hour and baking at 300° C. for ½ hour followed. The electrode was cooled to 25° C. and soaked in a solution of glycerin-sulfuric acid 10:1 by volume for 24 hours minimum, rinsed with acetone and baked at 90° C. for ½ hour to dry. The resulting unit weight of graphite was 2 mg./$cm^2$.

EXAMPLE 8
GRAPHITE "SALTED" WITH $WO_3$ POWDER

The graphite film was applied to the clean substrate as in Example 1 electrodes except that while the Graphokote 120 film was still wet, $WO_3$ powder was sprinkled onto the surface. The $WO_3$ particles became embedded in the graphite film as the electrode was air dried at 25° C. This step was followed by the 300° C. oven bake acid treatment, rinse and dry mentioned in the Type 1 electrode preparation. The resulting deposit was composed of approximately 0.5 gm./$cm^2$ $WO_3$ on 2.0 mg./$cm^2$ Graphokote 120.

EXAMPLE 9
GRAPHITE COATED WITH AMMONIUM PARATUNGSTATE

The electrode was prepared as in Example 1 except following the 300° C. bake and cooling period, a solution of 29 percent $NH_4OH$ saturated with $WO_3$ at 25° C. was brushed onto the graphite film and dried at 25° C. for ½ hour followed by an oven bake at 175° C. for ½ hour. The electrode was cooled to 25° C. and soaked in a solution of glycerin-sulfuric acid 10:1 by volume for 24 hours minimum. This step was followed by a rinse with acetone and baking at 90° C. for ½ hour to dry. Approximately 5 mg./$cm^2$ of ammonium paratungstate was added to the 2 mg./$cm^2$ of graphite film by this method.

EXAMPLE 10
GRAPHITE — AMMONIUM PARATUNGSTATE MIX

Graphokote 120 suspension was mixed with the saturated solution of $WO_3$ in $NH_4OH$ described in Example 9 electrode in volume ratio of three parts Graphokote 120 to one part $WO_3$ – $NH_4OH$ mix. The resulting mix was brushed onto the substrate and dried at 25° C. for ½ hour then oven baked at 175° C. for ½ hour. The acid treatment, rinse and dry mentioned in Example 1 electrode preparation followed. The resulting deposit was approximately 3.0 mg/$cm^2$ ammonium paratungstate and 2.2 mg./$cm^2$ of Graphokote 120.

EXAMPLE 11
GRAPHITE COATED WITH EVAPORATED $WO_3$ FILM

The electrode was prepared as in Example 1 except following the acetone rinse and 90° C. dry step a 1 μm thick $WO_3$ film was applied to the graphite surface by thermal evaporation in vacuum. Approximately 0.7 mg./$cm^2$ $WO_3$ was deposited upon 2 mg./$cm^2$ of Graphokote 120.

EXAMPLE 12
GRAPHITE MIXED WITH $WO_3$ POWDER

A mixture was made on a weight basis of 13 percent graphite (American Cyanamid Co.), 12 percent $WO_3$ and 75 percent clear Peterson Co. epoxy paint. The mixture was brushed or sprayed on a clean substrate, air dried at 25° C. for 15 minutes, then oven baked at 70° C. for 1 hour. The resulting deposit weight is 2 mg./$cm^2$ including 0.5 mg./$cm^2$ $WO_3$, 0.5 mg./$cm^2$ graphite (American Cyanamid Co.) and 1.0 mg./$cm^2$ epoxy. This electrode has the advantage of being cured at low temperatures, thus permitting common plastics to be used as substrates.

Other combinations of the materials discussed above may be employed to vary the final characteristics of the overall device, i.e., the percentage change in light transmission capability, the voltage required to establish the requisite field strength, the time for the change to occur, etc. The depth of coloration is also dependent upon the thickness of the persistent electrochromic layer. In theory, it would seem that the thicker the layer, the more color centers would be formed upon application of the electric field and therefore deeper coloration could be expected. However, since thin layers could be expected to color more quickly in some cases, the relationship between thickness of the layers and depth of color is not simple.

The inventive device can be useful in many ways. It can be used as part of an optical system involving reflective elements where close control of light intensity is desired without modifying its other properties. Thus no diaphragams or other separate light modulating elements would be necessary. Moreover, the optics may be simpler since the light rays are not altered except in intensity.

While the device has been illustrated as having a flat reflecting surface, it will be obvious that the reflecting surface may take any desired configuration such as a spherical or parabolic surface, for example.

The device is particularly suitable as a rear view mirror in motor vehicles for night driving. It is possible by the use of the device to reduce the intensity of reflected light from headlights of a following vehicle to a desired degree by merely coloring the electrochromic layer. This can be done by mere switching and is thus quick and effective.

While certain specific embodiments and preferred modes of practice of the invention have been described, this is solely for illustration, and it will be obvious that various changes and modifications may be made without departing from the spirit of the disclosure or the scope of the appended claims.

I claim:

1. A radiation reflective device having an electric field responsive radiation transmitting characteristic comprising:
   a. a persistent electrochromic material layer,
   b. an ion porous electrically conductive radiation reflective layer in contact with said persistent electrochromic material,
   c. a counter electrode,
   d. an electrolyte in contact with said reflective layer and said counter electrode, and
   e. means to pass an electric current between said counter electrode and said electrochromic material.

2. The device of claim 1 wherein said persistent electrochromic layer is coated on a transparent substrate.

3. The device of claim 1 wherein said counter electrode is graphite, an electrochromic material, or a mixture thereof.

4. The device of claim 1 wherein said persistent electrochromic material is tungsten oxide.

5. The device of claim 1 wherein said persistent electrochromic material is molybdenum oxide.

6. The device of claim 1 wherein said layers and electrode are in relatively thin layers to form a sandwich-like structure.

7. The device of clam 1 wherein said electrolyte is an acid.

8. The device of claim 7 wherein said electrolyte contains a gelling agent.

* * * * *